United States Patent
McClatchie et al.

(10) Patent No.: US 8,559,802 B1
(45) Date of Patent: Oct. 15, 2013

(54) SYSTEM AND METHOD FOR ISOLATING CAMERA MOVEMENT

(75) Inventors: Iain Richard Tyrone McClatchie, Los Altos, CA (US); Ian Rickard Muldoon, Redwood City, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/480,572

(22) Filed: May 25, 2012

(51) Int. Cl.
*G03B 17/00* (2006.01)
*G03B 29/00* (2006.01)

(52) U.S. Cl.
USPC .............................. 396/13; 396/428

(58) Field of Classification Search
USPC ...................................... 396/12, 13
See application file for complete search history.

(56) References Cited

U.S. PATENT DOCUMENTS

| | | | |
|---|---|---|---|
| 3,703,999 A * | 11/1972 | Forys et al. | 248/550 |
| 4,033,541 A * | 7/1977 | Malueg | 248/550 |
| 4,441,808 A | 4/1984 | Giacomelli | |
| 4,521,114 A | 6/1985 | Van Peski et al. | |
| 5,184,521 A * | 2/1993 | Tyler | 74/5.34 |
| 5,710,945 A * | 1/1998 | Thompson | 396/13 |
| 5,995,758 A * | 11/1999 | Tyler | 396/13 |
| 6,370,329 B1 | 4/2002 | Teuchert | |
| 6,965,411 B1 * | 11/2005 | Jones | 348/373 |
| 7,274,868 B2 * | 9/2007 | Segal et al. | 396/12 |
| 7,627,235 B2 | 12/2009 | McCutchen et al. | |
| 7,905,463 B2 | 3/2011 | Burnham et al. | |
| 8,240,919 B2 * | 8/2012 | Hirata | 384/100 |

\* cited by examiner

*Primary Examiner* — W B Perkey
(74) *Attorney, Agent, or Firm* — Dority & Manning, P.A.

(57) ABSTRACT

A system and method for isolating the motion of a camera relative to a base structure is disclosed. In one embodiment, the system may generally include a plurality of bearing pucks coupled to the base structure. Each of the bearing pucks may be configured to receive and expel a pressurized fluid. In addition, the system may include a camera support coupled to the camera. The camera support may include at least one bearing member defining a spherical surface. The bearing member may be positioned adjacent to the bearing pucks such that the pressurized fluid forms a fluid layer between the spherical surface and the bearing pucks. The fluid layer may suspend the bearing member relative to the bearing pucks such that the camera support is rotationally isolated from the base structure.

27 Claims, 10 Drawing Sheets

US 8,559,802 B1

SYSTEM AND METHOD FOR ISOLATING CAMERA MOVEMENT

FIELD

The present subject matter relates generally to a system and method for isolating camera movement and, more particularly, to a system and method for isolating the motion of a camera relative to a moving or unstable base structure, such as the fuselage of an airplane.

BACKGROUND

When capturing images with a camera, an enhanced signal-to-noise ratio may be obtained when the camera's sensor is exposed for a longer period of time. However, the exposure time is typically limited by motion blur, which generally results from rotational motion of the camera. Thus, when a camera is associated with a moving object (e.g., a moving vehicle, platform or other structure), it is typically desirable to restrict the rotational movement of the camera in order to prevent motion blur. For example, aerial photography captured with a camera(s) mounted on or within an airplane is often affected by motion blur as a result of the rotational and/or jerky movement of the plane.

Typically, cameras used with moving platforms are mounted on gimbals in order to allow rotational movement relative to the platform. However, ball bearings used in conventional gimbals have static friction, which allows rotation of the moving platform to be transferred to the camera. Moreover, because the bearings in conventional gimbals are typically maintained at or near the same location, the balls used within the bearings tend to form dents in the bearing race. This leads to increased static friction and, thus, the increased transmission of rotational movement to the camera.

SUMMARY

Aspects and advantages of the invention will be set forth in part in the following description, or may be obvious from the description, or may be learned through practice of the invention.

In one aspect, the present subject matter is directed to a system for isolating the motion of a camera relative to a base structure. The system may generally include a plurality of bearing pucks coupled to the base structure. Each of the bearing pucks may be configured to receive and expel a pressurized fluid. In addition, the system may include a camera support coupled to the camera. The camera support may include at least one bearing member defining a spherical surface. The bearing member may be positioned adjacent to the bearing pucks such that the pressurized fluid forms a fluid layer between the spherical surface and the bearing pucks. The fluid layer may suspend the bearing member relative to the bearing pucks such that the camera support is rotationally isolated from the base structure.

In another aspect, the present subject matter is directed to a method for isolating the motion of a camera relative to a base structure, wherein the camera is coupled to a camera support having at least one bearing member. The method may generally include supplying pressurized fluid to a plurality of bearing pucks coupled to the base structure, wherein the bearing pucks are positioned adjacent to a spherical surface of the bearing member and suspending the bearing member relative to the bearing pucks on a fluid layer formed between the spherical surface and the bearing pucks in order to rotationally isolate the camera support from the base structure.

In a further aspect, the present subject matter is directed to a system for capturing aerial photography from an airplane. The system may generally include a camera configured to capture images through an opening in a fuselage of the airplane and a plurality of bearing pucks coupled to a portion of the fuselage. Each of the bearing pucks may be configured to receive and expel a pressurized fluid. In addition, the system may include a camera support coupled to the camera. The camera support may include at least one bearing member defining a spherical surface. The bearing member may be positioned adjacent to the bearing pucks such that the pressurized fluid forms a fluid layer between the spherical surface and the plurality of bearing pucks. The fluid layer may suspend the bearing member relative to the bearing pucks such that the camera support is rotationally isolated from the fuselage.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
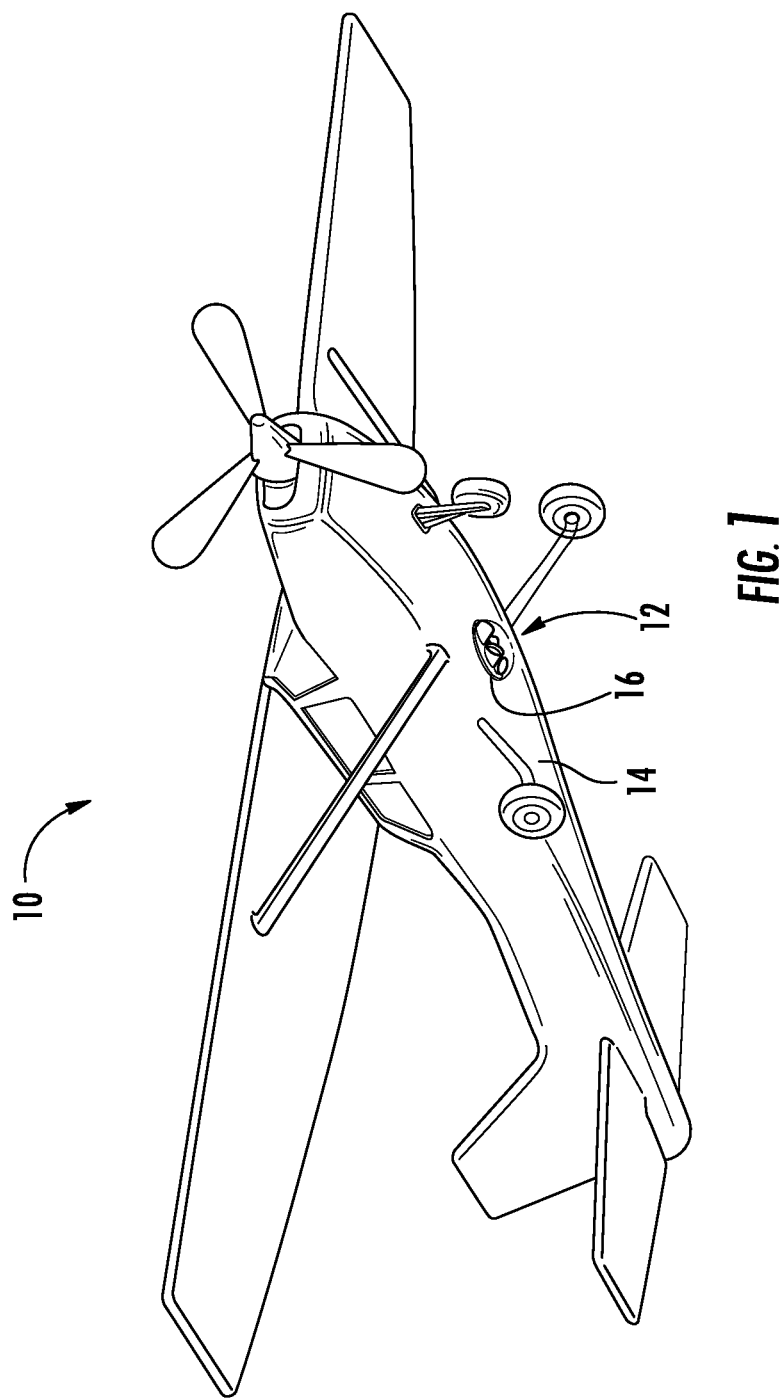
FIG. 1 illustrates a perspective view of one embodiment of a suitable environment within which the disclosed system and method may be advantageously used in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for isolating the movement of a camera relative to a base structure (e.g., a moving object, such as the fuselage of an airplane). For example, in several embodiments, the camera may be coupled to a camera support that includes at least one spherical bearing member configured to be suspended relative to the base structure on a layer of pressurized fluid (i.e., a pressurized liquid or gas, such as compressed air). This configuration may allow for the camera and the camera support to be rotationally isolated from the base structure (i.e., no contact between the components), thereby eliminating any static friction between the camera and the base structure. As a result, the transfer of rotational motion between the base structure and the camera may be eliminated. Moreover, the camera and camera support may be maintained at or near the same position relative to the base structure without deforming in a manner that may lead to contact and/or friction between the components of the system. Accordingly, the disclosed system may overcome many of the problems associated with the use of conventional gimbals.

In several embodiments, the spherical bearing member(s) of the disclosed camera support may be configured as a spherically-shaped wall(s) forming all or a portion of an entire sphere. For example, in applications in which the camera does not need the freedom to rotate in complete circles, the bearing member(s) may be configured as a small portion of an entire sphere, such as by being configured as a spherical cap or a spherical segment. As such, the bearing member(s) may include a pair of nested, spherical bearing surfaces, which may allow for the camera support (and, thus, the camera) to be rotationally isolated from the base structure without the need for the nested frames typically used in gimbals. For example, the spherical bearing surfaces may provide the camera support three degrees of freedom, thereby allowing the camera to be rotated in three dimensions relative to the base structure.

Referring now to the drawings, FIG. 1 illustrates one embodiment of a suitable environment within which the disclosed system and method may be advantageously used. As shown, an airplane 10 may be configured for capturing aerial photography by including at least one camera 12 mounted to and/or within a fuselage 14 of the airplane. Specifically, in several embodiments, the camera 12 may be mounted in and/or extend through an opening 16 defined in a bottom portion of the fuselage 14. Thus, the field of view of the camera 12 may be directed downward, thereby allowing the camera 12 to capture images of the environment positioned below the airplane 10.

As indicated above, the exposure time of the camera 12 may often be limited by motion blur resulting from the transfer of rotational motion from the airplane's fuselage 14 to the camera 12. For instance, when the fuselage 14 is rotated as the airplane 10 is turning and/or when the motion of the airplane 10 is bumpy and/or jerky, the camera 12 may often rotate with the fuselage 14 relative to the general direction of travel of the airplane 10, thereby negatively impacting the quality of the images captured by the camera 12. Accordingly, use of the disclosed system and method to rotationally isolate the motion of the camera 12 relative to the motion of the airplane fuselage 14 may allow for the quality of the images captured by the camera 12 to be significantly improved.

It should be appreciated that the airplane 10 shown in FIG. 1 is merely illustrated to provide one example of an exemplary setting within which the disclosed system and method may be advantageously used. Thus, one of ordinary skill in the art should readily appreciate that the present subject matter need not be limited to aerial photography applications but may generally be utilized in any application in which it is desired to rotationally isolate the motion of a camera relative to a base structure.

Figure 2:
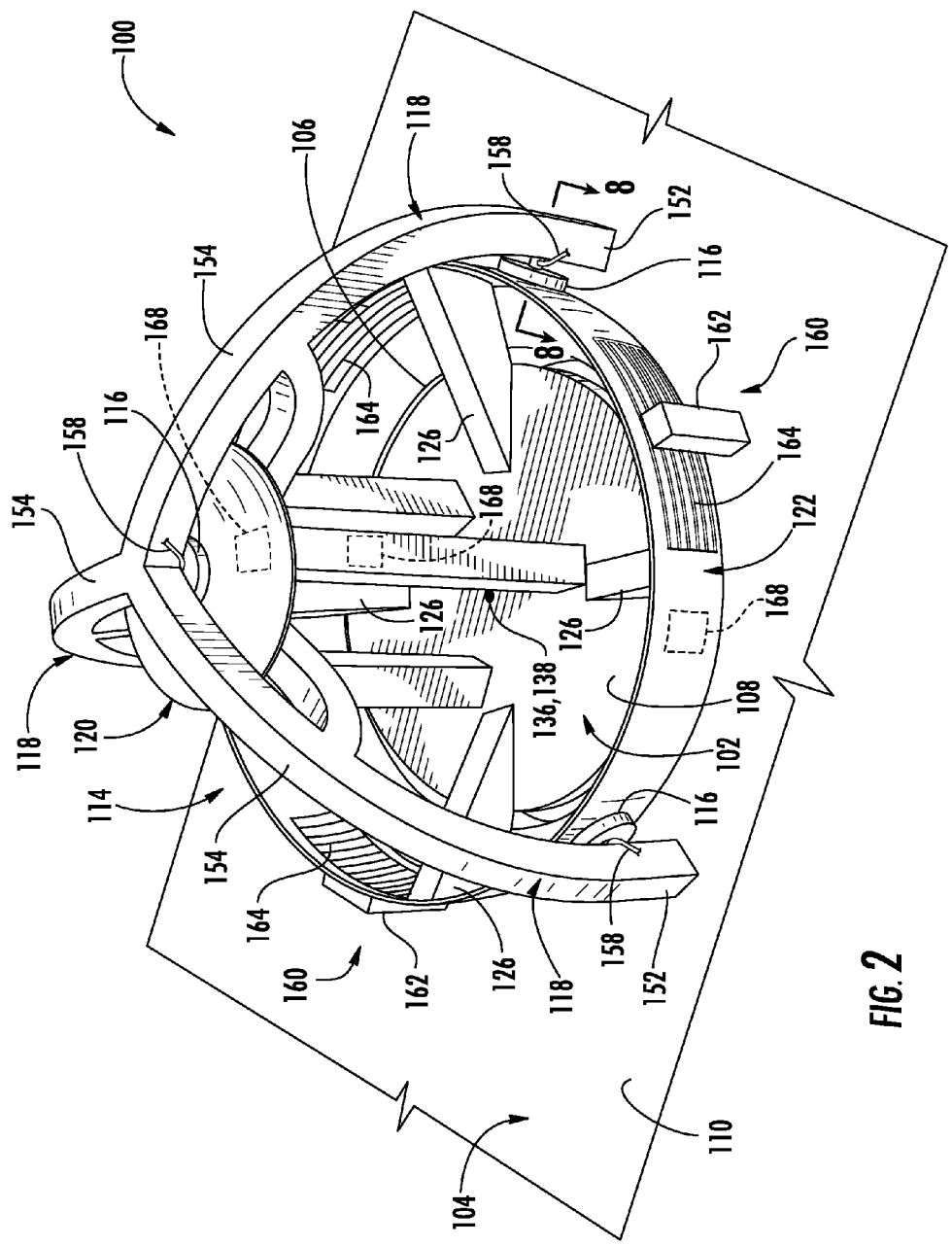
FIG. 2 illustrates a top, perspective view of one embodiment of a system for isolating the motion of a camera relative to a base structure in accordance with aspects of the present subject matter.
Figure 3:
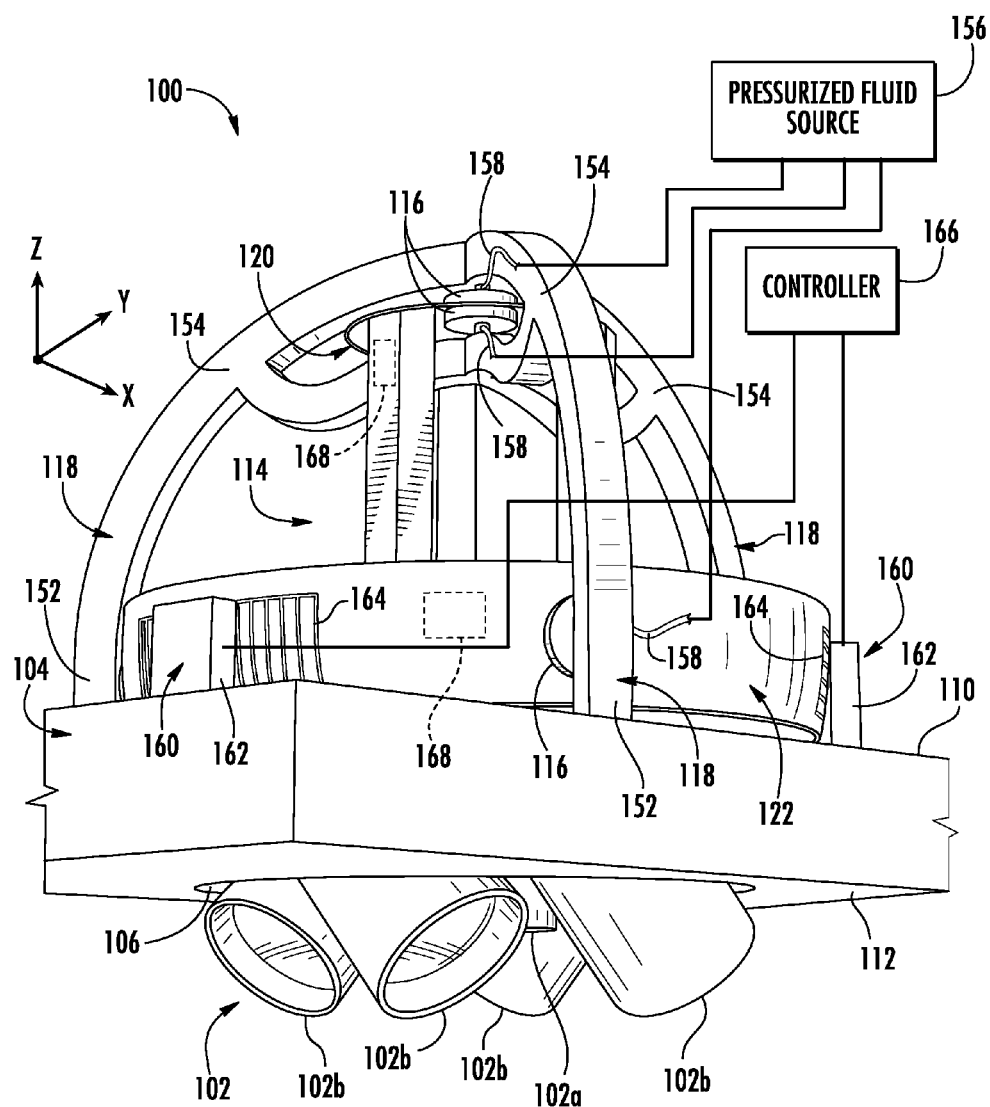
FIG. 3 illustrates a bottom, perspective view of the system shown in FIG. 2.
Figure 4:
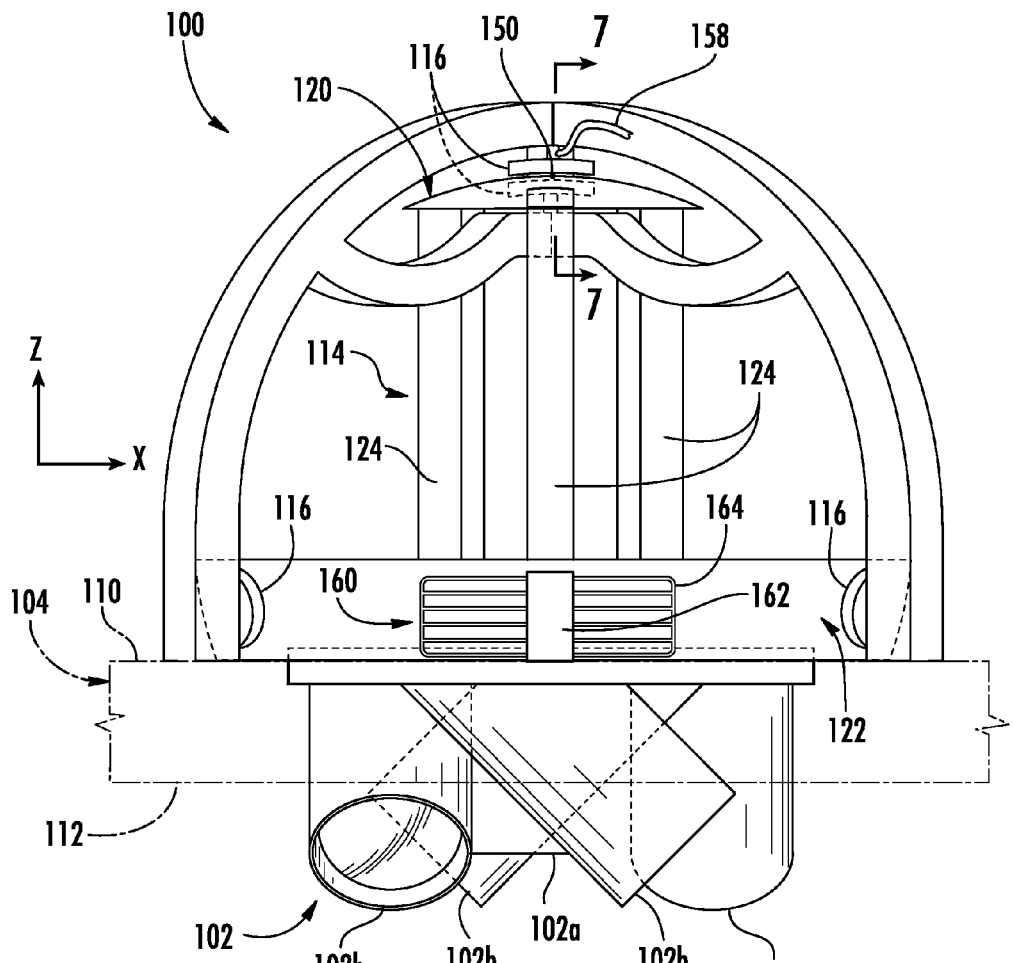
FIG. 4 illustrates a side view of the system shown in FIG. 2.
Figure 5:
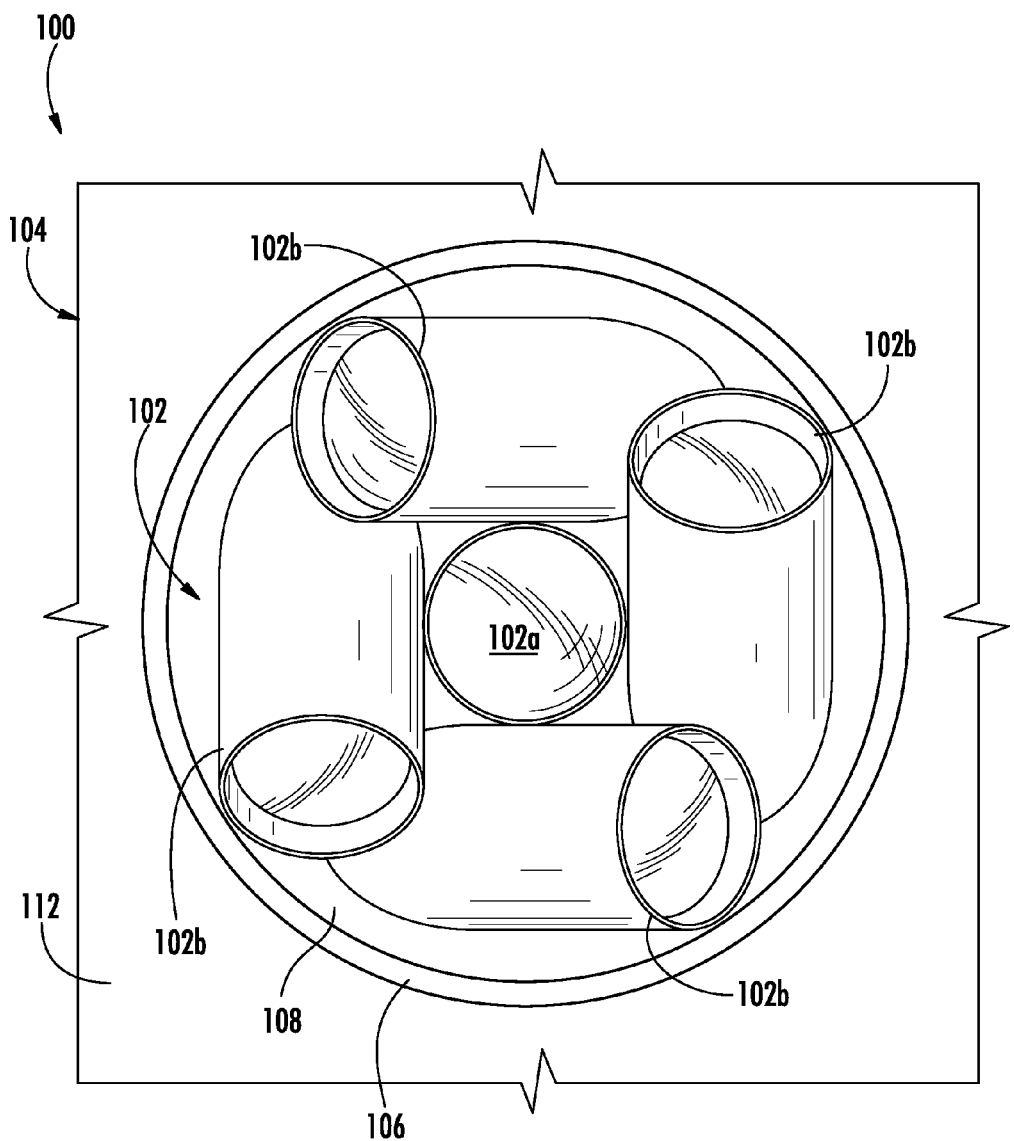
FIG. 5 illustrates a bottom view of the system shown in FIG. 2.
Figure 6:
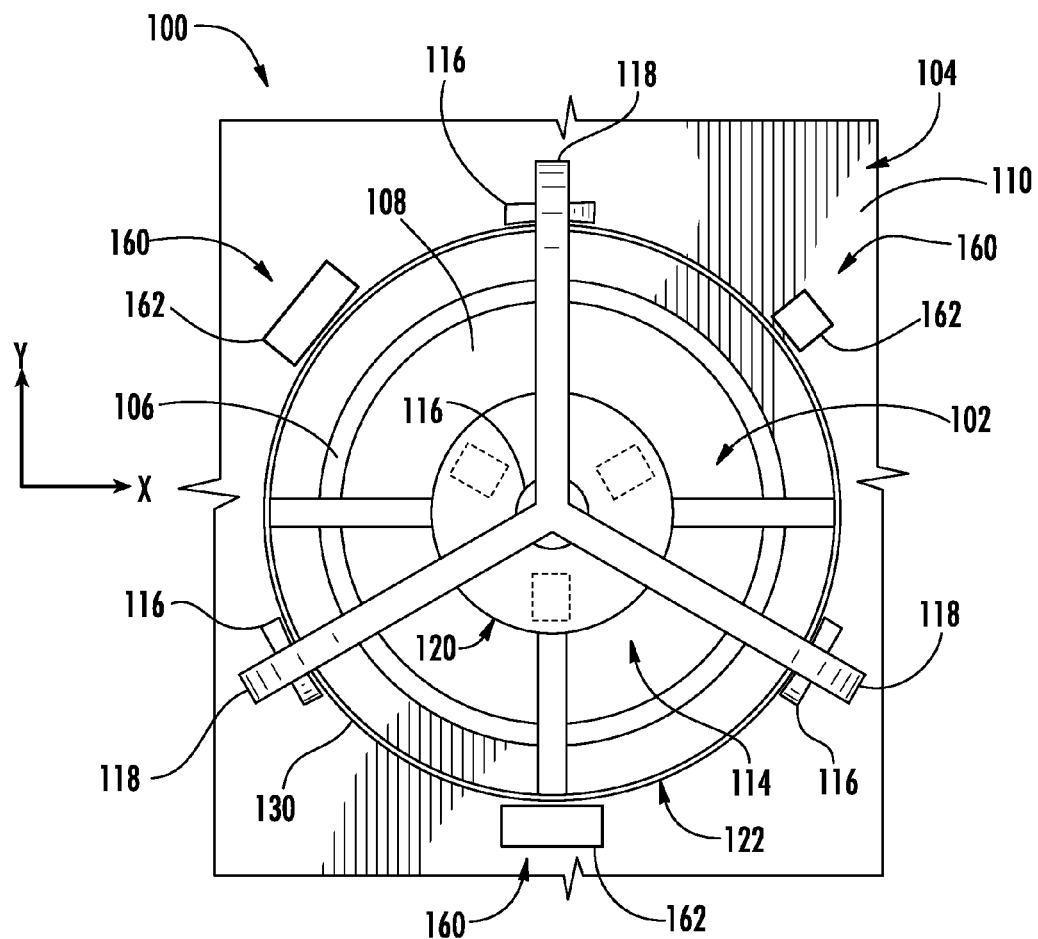
FIG. 6 illustrates a top view of the system shown in FIG. 2.
Figure 7:
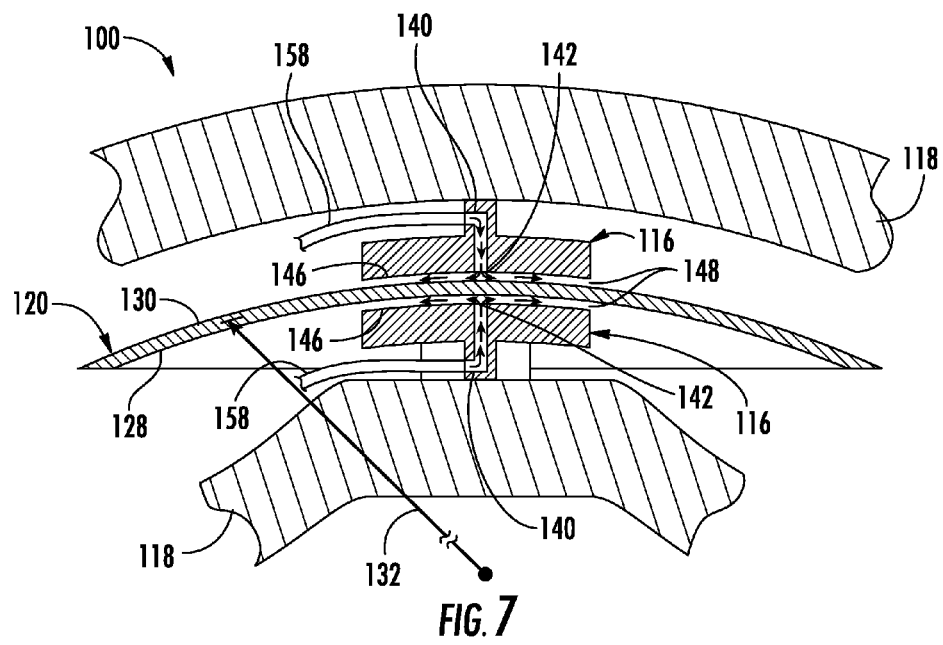
FIG. 7 illustrates a cross-sectional view of the system shown in FIG. 2 taken about line 7-7 (FIG. 4)
Figure 8:
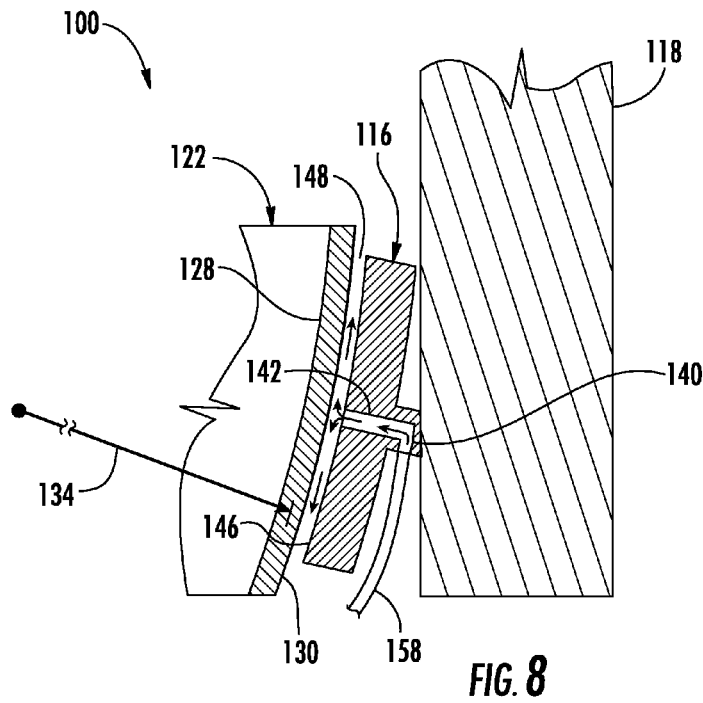
FIG. 8 illustrates a cross-sectional view of the system shown in FIG. 2 taken about line 8-8 (FIG. 2)

Referring now to FIGS. 2-8, one embodiment of a system 100 for isolating the motion of a camera 102 relative to a base structure 104 is illustrated in accordance with aspects of the present subject matter. In particular, FIGS. 2 and 3 illustrate top and bottom perspective views, respectively, of one embodiment of the disclosed system 100. FIG. 4 illustrates a side view of the system 100 shown in FIGS. 2 and 3. FIGS. 5 and 6 illustrate bottom and top views, respectively, of the system 100 shown in FIGS. 2 and 3. Additionally, FIGS. 7 and 8 illustrate cross-sectional views of the system 100 taken about line 7-7 (FIG. 4) and line 8-8 (FIG. 2).

In general, the various components of the system 100 may be configured to suspend a camera 102 relative to a base structure 104 in a manner that rotationally isolates the movement of the camera 102 from the movement of the base structure 104. In several embodiments the camera 102 may be suspended within an opening 106 defined through the base structure 104. For instance, as shown in FIGS. 2, 3, 5 and 6, the camera 102 (including a camera base 108) may extend through an opening 106 defined between opposed sides 110, 112 of the base structure 104. As a result, while the various components of the system 100 may be located on a first side 110 of the base structure 104 (e.g., within the base structure 104), the camera 102 may have a field of view on a second side 112 of the base structure 104 (e.g., outside the base structure 104).

It should be appreciated that the base structure 104 may generally comprise any suitable object and/or structure from which the camera 102 is desired to be rotationally isolated. For example, in one embodiment, the base structure 104 may comprise the fuselage 14 of an airplane 10 (FIG. 1). In such an embodiment, the first side 110 of the base structure 104 may correspond to the interior of the fuselage 14 and the second side 112 of the base structure 104 may correspond to the exterior of the fuselage 14. Thus, by suspending the camera 102 within the opening 16, the camera 102 may be configured to capture photographs of the environment outside the airplane 10. In other embodiments, the base structure 104 may comprise any other suitable object and/or structure, such as a moving platform, a vibrating building floor or ceiling and/or any other suitable moving and/or unstable object and/or structure.

Additionally, the camera 102 may generally be configured as any suitable camera known in the art. For example, in several embodiments, the camera 102 may be a digital camera, such as a digital still-image camera or a digital video camera. In addition, it should be appreciated that, as used herein, the singular term "camera" may refer to a single camera or multiple cameras. For instance, in several embodiments, the camera 102 may be configured as a plurality of cameras 102a, 102b. In such embodiments, the cameras 102a, 102b may be positioned at different orientations relative to one another in order to capture various views (e.g., a nadir and/or an oblique view) of the environment located on the second side 112 of the base structure 104. For instance, as shown in FIGS. 3-5, in one embodiment, one camera 102a may be oriented vertically within the camera base 108 and various auxiliary cameras 102b may be spaced apart around the vertically oriented camera 102a (e.g., 90 degree spacing), with each auxiliary camera 102b being oriented within the camera base 108 at a suitable angle (e.g., 45 degrees).

It should be appreciated that, in the several embodiments, the various components of the camera 102 may be housed within and/or extend from the camera base 108. For example, internal components, such as an image sensor(s), a processor (s), memory and/or the like, may be housed within the camera base 108, while external components, such as a lens(es), may extend from the camera base 108.

As particularly shown in FIGS. 2-4, in several embodiments, the disclosed system may generally include a camera support 114 coupled to the camera 102 and a plurality bearing pucks 116 coupled to the base structure 104 (e.g., via a suitable support structure 118). In general, the camera support 114 may be configured to be suspended relative to the bearing pucks 116 on a thin layer of pressurized fluid (e.g., pressurized air, water and/or any other suitable fluid). For example, in several embodiments, the camera support may include a first bearing member 120 and a second bearing member 122, with each bearing member 120, 122 being positioned adjacent to one or more of the bearing pucks 116. In such embodiments, a thin fluid layer may be formed between each bearing member 120, 122 and its associated bearing pucks 116, thereby suspending the camera support 114 relative to the bearing pucks 116. In addition, the camera support 114 may include one or more support arms 124, 126 coupled between the bearing members 120, 122 and the camera 102 (e.g., via the camera base 108). For instance, as shown in FIG. 4, one or more support arms 124 (e.g., three support arms 124) may be coupled between the first bearing member 120 and the camera 102. Similarly, as shown in FIG. 2, one or more support arms 126 (e.g., four support arms 126) may be coupled between the second bearing member 122 and the camera 102. Thus, by coupling the bearing members 120, 122 to the camera 102, the camera 102 may be supported in a suspended position relative to the base structure 104 when the bearing members 120, 122 are suspended relative to the bearing pucks 116.

In several embodiments, the bearing members 120, 122 of the camera support 114 may be configured as spherically-shaped walls defining all or a portion of an entire sphere. For example, as particularly shown in FIGS. 4 and 7, the first bearing member 120 may be configured as a spherical cap (i.e., the portion of a sphere defined above or below a plane cutting through the sphere), such as by configuring the first bearing member 120 as a top portion of a sphere. Similarly, as shown in FIGS. 2-4, the second bearing member 122 may be configured as a spherical segment (i.e., the portion of a sphere defined between parallel planes cutting through the sphere), such as by configuring the second bearing member 122 as a middle portion of a sphere. Thus, each bearing member 120, 122 may include nested, spherical bearing surfaces 128, 130. For instance, as shown in FIGS. 7 and 8, each bearing member 120, 122 may include a first or inner bearing surface 128 defining the concave, spherical surface of the bearing member 120, 122 and a second or outer bearing surface 130 defining the convex, spherical surface of the bearing member 120, 122. As a result, when the bearing members 120, 122 are suspended relative to the bearing pucks 116, the bearing members 120, 122 may have three degrees of rotational freedom.

It should be appreciated that the spherical surfaces 128, 130 of the first and second bearing members 120, 122 may generally define any suitable radius 132, 134 (FIGS. 7 and 8). In one embodiment, the radius 132 of the first bearing member 120 may be the same as the radius 134 of the second bearing member 122. Alternatively, the radius 132 of the first bearing member 120 may differ from the radius 134 of the second bearing member 122. Regardless, the bearing members 120, 122 may, in several embodiments, be positioned relative to one another such that each bearing member 120, 122 is rotatable about a common or shared center of rotation 136 (FIG. 2). Additionally, in one embodiment, the camera support 114 and/or the camera 102 may be configured such that a center of gravity 138 (FIG. 2) of the camera support 114 and the camera 102 is located at the shared center of rotation 136 of the bearing members 120, 122.

As indicated above, the disclosed system 100 may also include a plurality of bearing pucks 116. In general, the bearing pucks 116 may be configured to receive pressurized fluid and expel such fluid onto the adjacent, spherical surfaces 128, 130 of the bearing members 120, 122, thereby forming a fluid layer between the bearing pucks 116 and the bearing members 120, 122. For example, as shown in FIGS. 7 and 8, each bearing puck 116 may include one or more inlets 140 for receiving a pressurized fluid (e.g., via a suitable hose 158). The inlet(s) 140 may, in turn, be in flow communication with one or more outlets 142 (e.g., via one or more internal channels) for expelling the pressurized fluid between a bearing surface 146 of each bearing puck 116 and the adjacent spherical surface 128, 130 of the corresponding bearing member 120, 122. In several embodiments, the bearing surface 146 of each bearing puck 116 may be configured to define a spherical profile that generally corresponds to the spherical profile of the adjacent spherical surface 128, 130. For example, as shown in FIGS. 7 and 8, each bearing surface 146 may define a radius of curvature generally corresponding to the radius of curvature of the adjacent spherical surface 128, 130. Thus, when the pressurized fluid is expelled from the outlet(s) 140, a thin fluid layer (represented by the arrows) may be formed between each bearing surface 146 and the adjacent spherical surface 128, 130 that defines a spherically-shaped gap 148 between such components. This fluid layer may generally serve to suspend the bearing members 120, 122 relative to the bearing pucks 116, thereby providing a contact-free, frictionless interface between the bearing surfaces 146 and the spherical surfaces 128, 130. As a result, the camera support 114 (and, thus, the camera 102) may be rotationally isolated from the bearing pucks 116 (and, thus, the base structure 104).

It should be appreciated that the bearing pucks 116 may be spaced apart around and/or positioned relative to the spherical surfaces 128, 130 of the bearing members 120, 122 in any suitable manner that provides rotational freedom to the bearing members 120, 122 while constraining their translational movement along one or more axes (e.g., the x-, y- and z-axes shown in FIGS. 3, 4 and 6). For example, in several embodiments, a pair of radially aligned bearing pucks 116 may be associated with the first bearing member 120. Specifically, as shown in FIGS. 3, 4 and 7, a first bearing puck 116 may be positioned adjacent to the inner spherical surface 128 of the first bearing member 120 and a second bearing puck 116 may be positioned adjacent to the outer spherical surface 130 of the first bearing member 120, with the bearing pucks 116 being radially aligned at a top or apex point 150 (FIG. 4) of the first bearing member 120. Additionally, in several embodiments, a plurality of bearing pucks 116 may be spaced around the outer circumference of the second bearing member 122. For instance, as particularly shown in FIG. 6, in one embodiment, three bearing pucks 116 may be spaced apart around the outer spherical surface 130 of the second bearing member 122 (e.g., with a circumferential spacing of 120°). By positioning the bearing pucks 116 as shown in the illustrated embodiment, the bearing pucks 116 may generally serve to constrain the motion of the first and second bearing members 120, 122 (and, thus, the camera support 114) in both the vertical direction (i.e., in the direction of the z-axis shown in FIGS. 3 and 4) and along the horizontal plane (i.e., in the plane defined by the x- and y-axes shown in FIGS. 3 and 6). However, due to the spherical configuration of the both the bearing members 120, 122 and the bearing pucks 116, the bearing members 120, 122 (and, thus, the camera support 114) may be freely rotated relative to the bearing pucks 116 in any direction (e.g., about the x-, y-, and z-axes).

Additionally, to support the bearing pucks 116 adjacent to the spherical surfaces 128, 130 of the bearing members 120, 122, it should be appreciated that the disclosed system 100 may also include a support structure 118 for coupling the bearing pucks 116 to the base structure 104. In general, the support structure 118 may have any suitable configuration that allows the bearing pucks 116 to be properly positioned relative to the bearing members 120, 122. For instance, in one embodiment, the support structure 118 may include three support members 118 extending outwardly from the base structure 104. Specifically, as shown in FIGS. 2-4, each support member 118 may include a base end 152 secured to the base structure 104 and a forked end 154 having separate arms intersecting at common end points above and below the apex point 150 (FIG. 4) of the first bearing member 120. As such, the bearing pucks 116 associated with the second bearing member 122 may be coupled to and extend from the support members 118 at a location generally adjacent to the base end 152 of each support member 118. Similarly, the bearing pucks 116 associated with the first bearing member 120 may be coupled to and extend from the common end points of the forked ends 154 of the support members 118. However, it should be appreciated that that present subject matter need not be limited to any specific configuration for the support structure 18. Rather, any suitable support structure that is configured to support the bearing pucks 116 adjacent to the spherical surface(s) 128, 130 of the bearing members 120, 122 may be utilized in accordance with aspects of the present subject matter.

It should also be appreciated that the bearing pucks 116 may be configured to receive pressurized fluid from any suitable pressurized fluid source 156 (FIG. 3). For example, in several embodiments, the inlet(s) 140 of each bearing puck 116 may be in flow communication with an air compressor via a hose 158 and/or other suitable fluid coupling. In other embodiments, the inlet(s) 140 may be in flow communication with a pressurized fluid vessel and/or any other suitable pressurized fluid source.

Referring particularly to FIGS. 2-4 and 6, the disclosed system 100 may also include one or more actuation devices 160 for controlling the movement of the camera support 114 relative to the bearing pucks 116 and, thus, the movement of the camera 102 relative to the base structure 104. In several embodiments, the actuation device(s) 160 may be configured as one or more frictionless, non-contact drive mechanisms. As such, the actuation device(s) 160 may be designed to control the movement of the camera support 114 without restricting its rotational freedom of motion.

For instance, in one embodiment, the system 100 may include a plurality of electromagnetic actuation devices 160 (e.g., three electromagnetic actuation devices 160) spaced apart around the outer circumference of the second bearing member 122. In such an embodiment, each electromagnetic actuation device 160 may include a magnetic field generator 162 (e.g., one or more coils, such as a set of coils, electrically coupled to a suitable current source) and one or more corresponding magnets 164. For example, as particularly shown in FIGS. 2 and 6, each magnetic field generator 162 may be mounted to the base structure 104 so as to be positioned adjacent to the outer spherical surface 130 of the second bearing member 122. In addition, each magnet 164 may be integrated into and/or mounted to the second bearing member 122 at a location adjacent to its corresponding magnetic field generator 162. For instance, as shown in FIGS. 2-4, the magnets 164 may be configured as magnetic stripes or lines formed along the outer spherical surface 130 of the second bearing member 122 at locations adjacent to the magnetic field generators 164. In such an embodiment, the orientation of the magnetic lines along the outer spherical surface 130 may be selected so as to allow each actuation device 160 to control the rotation of the camera support 114 in at least one direction. For example, one of the actuation devices 160 may include magnetic lines oriented in the vertical direction to allow the camera support 114 to be rotated about the z-axis shown in FIGS. 3 and 4. Similarly, in embodiments in which the system 100 includes three electromagnetic actuation devices 160, the remaining two actuation devices 160 may be spaced apart from one another (e.g., by 90°) and may include magnetic lines oriented in the horizontal direction to allow the camera support 114 to be rotated about the x- and y-axes shown in FIGS. 3 and 6.

It should be appreciated that, by using one or more electromagnetic actuation devices 161 to control the movement of the camera support 114 relative to the bearing pucks 116, the torque applied to the camera support 114 may be independent of the relative position and/or velocity between the camera support 114 and the base structure 104. As such, any movements and/or vibrations of the base structure 104 (including high-frequency vibrations) may not be transmitted to the camera support 114 via the actuation devices 161.

It should also be appreciated that, in alternative embodiments, the actuation device(s) 160 may be configured as any other suitable contact and/or non-contact drive mechanism(s) and/or actuator(s) known in the art. For example, in one embodiment, the actuation device(s) 160 may be configured to control the movement of the camera support 114 by directing fluid jets (e.g., jets of pressurized air) against the spherical surfaces 128, 130 of the bearing members 120, 122.

Additionally, as shown in FIG. 3, in several embodiments, the actuation device(s) 160 may be communicatively coupled to a controller 166 (via a wired or wireless connection). In general, the controller 166 may be any suitable control device (e.g., a processor, microcontroller or any other suitable control circuit) that is configured to control the operation of the actuation device(s) 160. For example, in embodiments in which the actuation device(s) 160 is configured as one or more electromagnetic actuation devices, the controller 166 may be configured to regulate the current supplied to each magnetic field generator 162 (e.g., by utilizing one or more suitable drive circuits), thereby allowing the controller 166 to control the movement of the camera support 114. Specifically, by regulating the current supplied to each magnetic field generator 162, the direction and/or the magnitude of the magnetic field generated by the magnetic field generator 162 may be carefully controlled. As such, the controller 166 may be configured to control the amount of torque transmitted between the magnetic field generator 162 and the magnet(s) 164 of each electromagnetic actuator, as well as the speed at which the camera support 114 (and, thus, the camera 102) is rotated relative to the base structure 104.

Moreover, in several embodiments, the disclosed system 100 may also include one or more orientation sensors 168 configured to monitor the orientation of the camera support 114 and/or the camera 102. For example, as shown in FIGS. 2 and 3, one or more orientation sensors 168 may be mounted to and/or integrated within one or more of the components of the camera support 114, such as by being mounted to and/or integrated within the first and/or second bearing member 120, 122 and/or one or more of the support arms 124, 126. However, in other embodiments, the orientation sensors 168 may be associated with any other component of the system 100, such as by being mounted to and/or integrated within an actuation device(s) 160 of the system. The orientation sensors 168 may generally be any suitable sensors that are capable of providing an indication of the orientation of the camera support 114 and/or the camera 102 relative to the base structure 104 and/or any other suitable reference point, such as one-dimensional or multi-dimensional encoders, accelerometers, gyroscopes, inertial sensors and/or the like. Additionally, in several embodiments, the sensors 168 may be communicatively coupled to the controller 166 via a wireless or wired connection. As such, orientation data may be transmitted from the sensors 168 to the controller 166 for subsequent processing and/or analysis. For instance, the controller 166 may be configured to analyze the orientation data to determine the orientation of the camera support 114 and/or the camera 102 relative to the base structure 104 and, based on such determination, control the operation of the actuation device 160 in a manner such that the camera 102 is maintained at and/or moved to a desired orientation.

Figure 9:
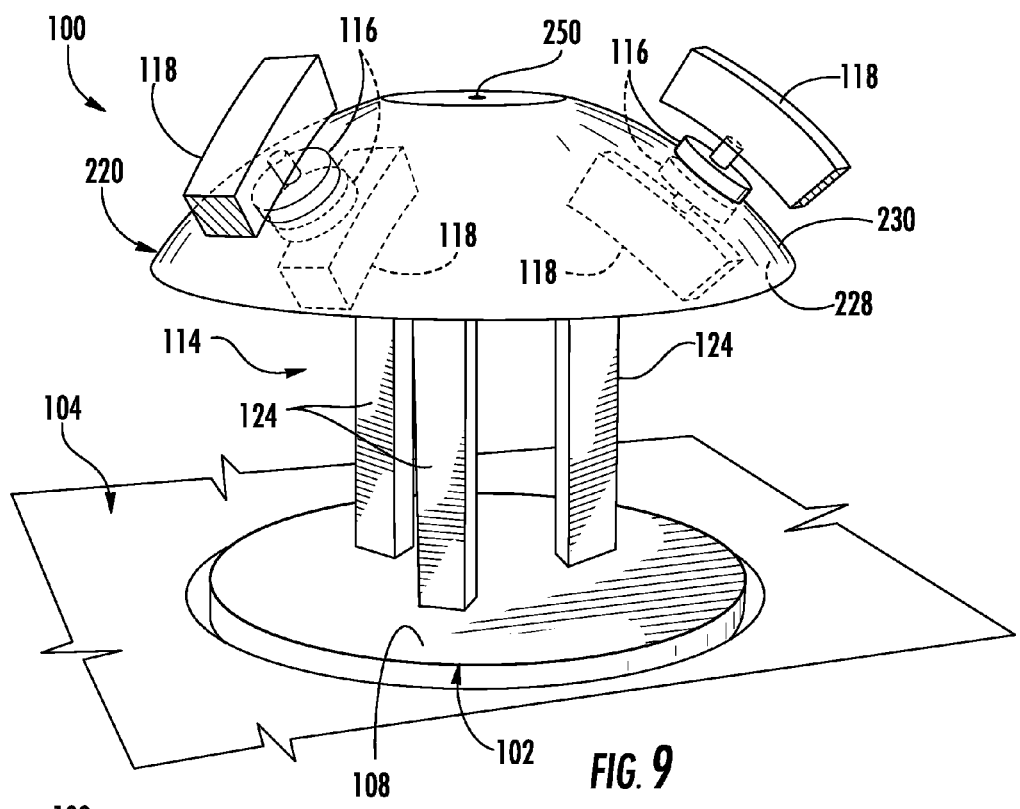
FIG. 9 illustrates a perspective view of another embodiment of a system for isolating the motion of a camera relative to a base structure in accordance with aspects of the present subject matter.
Figure 10:
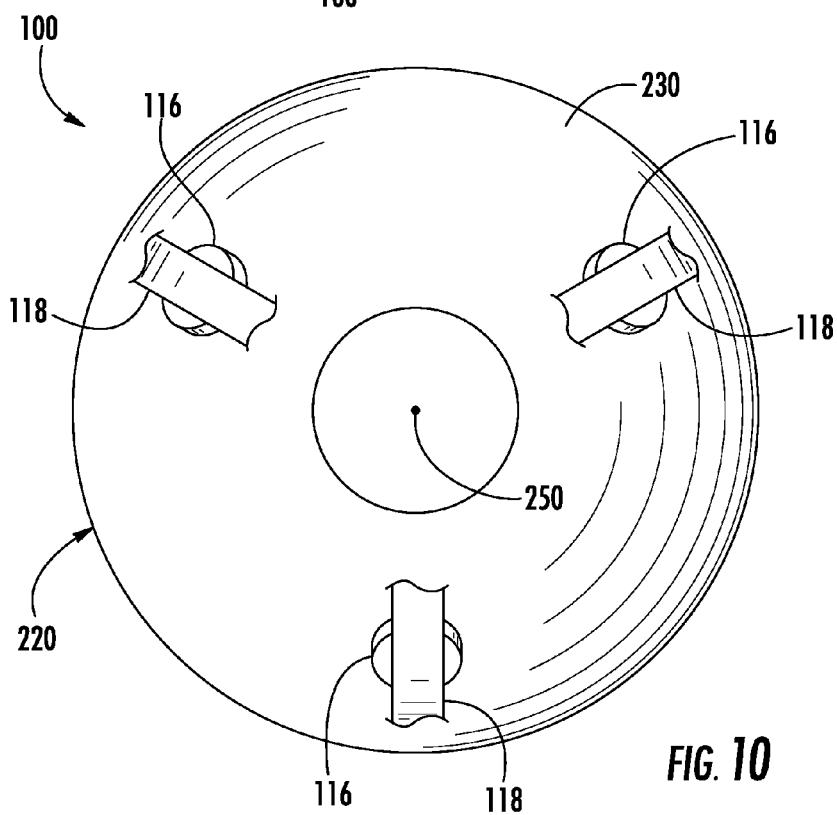
FIG. 10 illustrates a top view of the system shown in FIG. 9.
Figure 11:
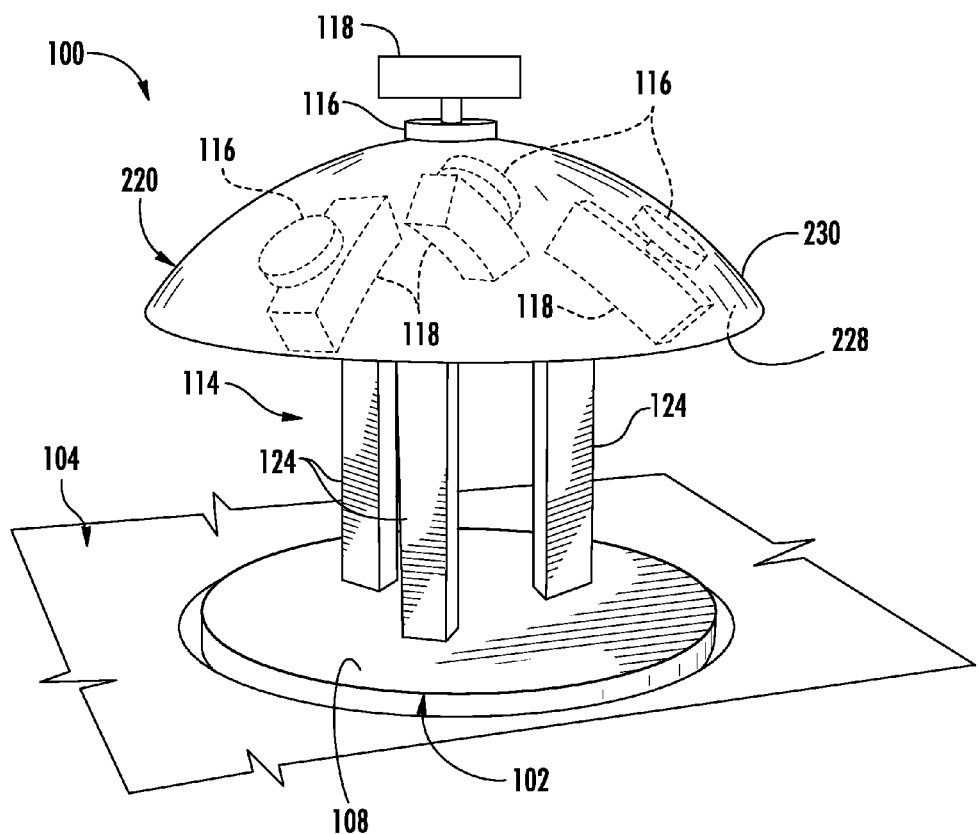
FIG. 11 illustrates a perspective view of a further embodiment of a system for isolating the motion of a camera relative to a base structure in accordance with aspects of the present subject matter.
Figure 12:
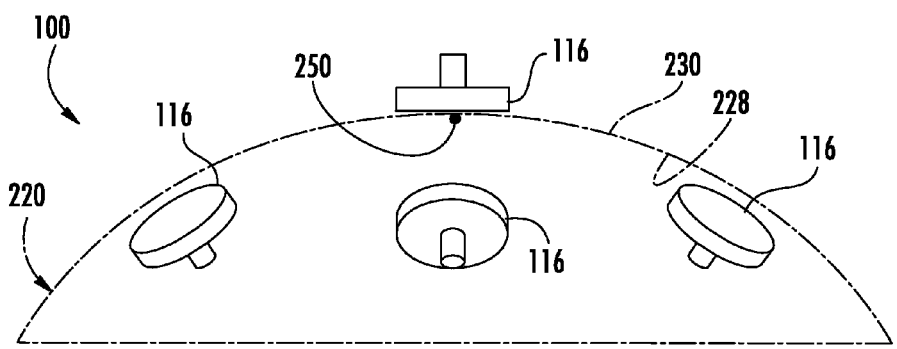
FIG. 12 illustrates a partial, side view of the system shown in FIG. 11.

Referring now to FIGS. 9-12, alternative embodiments of the system 100 described above for isolating the motion of a camera 102 relative to a base structure 104 are illustrated in accordance with aspects of the present subject matter. Specifically, FIGS. 9 and 10 illustrate a first alternative embodiment of the disclosed system 100, particularly illustrating a first bearing puck arrangement that may be utilized with embodiments having a single bearing member. Additionally, FIGS. 11 and 12 illustrate a second alternative embodiment of the disclosed system 100, particularly illustrating a second bearing puck arrangement that may be utilized with embodiments having a single bearing member.

As shown in FIGS. 9-12, the illustrated systems 100 may generally include many or all of the same components as the system 100 described above with reference to FIGS. 2-8. For instance, the system 100 may include a camera support 114 coupled to the camera 102 (e.g., using a plurality of support arms 124 coupled to a camera base 108) and a plurality of bearing pucks 116 coupled to the base structure 104. As described above, the bearing pucks 116 may be configured to receive and expel a pressurized fluid in a manner that suspends the camera support 114 relative to the bearing pucks 116, thereby rotationally isolating the camera 102 from the base structure 104.

However, unlike the embodiment shown in FIGS. 2-8 in which the camera support 114 includes first and second bearing members 120, 122, the illustrated camera supports 114 only include a single bearing member 220. As shown in FIGS. 9-12, in several embodiments, the bearing member 220 may be configured the same as or similar to the first bearing member 120 described above. For example, the bearing member 220 may be configured as a spherically-shaped wall forming a spherical cap, such as by being configured as the top portion of a sphere. As such, the bearing member 220 may include a first or inner bearing surface 228 defining the concave, spherical surface of the bearing member 220 and an outer or second bearing surface 230 defining the convex, spherical surface of the bearing member 220.

It should be appreciated that, by excluding the second bearing member 122 from the camera support 114, the bearing pucks 116 that would otherwise serve to constrain the movement of the camera support 114 in the horizontal direction (i.e., movement along the x- and y-axes shown in FIGS. 3 and 6) have been removed. As a result, the arrangement of the bearing pucks 116 must be adjusted in order to sufficiently constrain the movement of the camera support 114 in both the vertical and horizontal directions.

For instance, as shown in FIGS. 9 and 10, in one embodiment, a plurality of radially aligned pairs of bearing pucks 116 may be spaced apart circumferentially around the bearing member 220. In particular, each pair of bearing pucks 116 may include a first bearing puck 116 positioned adjacent to the inner spherical surface 228 of the bearing member 220 and a second bearing puck 116 positioned adjacent to the outer spherical surface 230 of the bearing member 220. Additionally, as particularly shown in the illustrated embodiment, unlike the single pair of bearing pucks 116 associated with the first bearing member 120 described above, the pairs of bearing pucks 116 may be circumferentially offset from a top or apex point 250 of the bearing member 220. As a result, the bearing pucks 116 may be oriented relative to the inner and outer spherical surfaces 228, 230 of the bearing member 220 in a manner that allows each pair of bearing pucks 116 to constrain the movement of the camera support 114 in both the vertical and horizontal directions.

As particularly shown in FIG. 10, the system 100 includes three pairs of bearing pucks 116 spaced apart equally around the circumference of the bearing member 220 (e.g., by being spaced apart from one another by 120°). However, it should be appreciated that, in other embodiments, the system 100 may generally include any suitable number of bearing puck pairs having any suitable circumferential spacing relative to one another.

As an alternative to pairing the bearing pucks 116 along the inner and outer spherical surfaces 228, 230 of the bearing member 220, the bearing pucks 116 may be arranged in any other suitable manner that constrains the movement of the camera support 114 in both the vertical and horizontal directions. For example, in the embodiment shown in FIGS. 11 and 12, the system 100 includes a plurality of bearing pucks 116 positioned at various locations along the inner and outer spherical surfaces 228, 230 of the bearing member 220. Specifically, as shown, the system 100 includes three bearing pucks 116 spaced apart equally around the inner circumference of the bearing member 220 (e.g., by being spaced apart from one another by 120°) and a single bearing puck 116 positioned at the top or apex point 250 (FIG. 12) of the bearing member 220. However, in other embodiments, the system 100 may include any number of bearing pucks 116 having any suitable circumferential spacing around the inner and/or outer circumference of the bearing member 220. Regardless, by positioning the bearing pucks 116 at one or more locations along the inner and outer spherical surfaces 228, 230 of the bearing member 220, the camera support 114 may be constrained in both the vertical and horizontal directions.

It should be appreciated that, similar to the embodiment described above with reference to FIGS. 2-8, the embodiments of the system 100 shown in FIGS. 9-12 may also include one or more actuation devices 160 configured to control movement of the camera support 114 relative to the bearing pucks 116 and, thus, the movement of the camera 102 relative to the base structure 104. In addition, the illustrated systems 100 may also include a controller 166 configured to control the operation of the actuation device(s) 160 and/or one or more sensors 168 configured to monitor the orientation of the camera support 114 and/or the camera 102.

It should also be appreciated that, although only partially shown in FIGS. 9-11, the illustrated systems 100 may also include a support structure 118 for coupling the bearing pucks 116 to the base structure 104. For example, similar to the embodiment described with reference to FIGS. 2-8, the support structure 118 may include one or more support members 118 extending outwardly from the base structure 104 in any suitable manner that allows the bearing pucks 116 to be supported at the positions shown in FIGS. 9-12.

As described above with reference to FIGS. 2-12, bearing pucks 116 may be positioned on opposite surfaces 128, 130, 228, 230 of one or more of the bearing members 120, 122, 220 to constrain the camera support 114 in the vertical and/or horizontal direction. However, in alternative embodiments, the camera support 114 may be constrained in the vertical and/or horizontal direction using permanent magnets, thereby eliminating the need to have pucks 116 positioned on opposite surfaces 128, 130, 228, 230 of the bearing member (s) 120, 122, 220. For instance, permanent magnets may be placed in one or more of the bearing pucks 116 and in the bearing member(s) 120, 122, 220 at locations adjacent to such bearing puck(s) 116, thereby drawing the bearing member(s) 120, 122, 220 and the puck(s) together 116. As such, the bearing member(s) 120, 122, 220 may be prevented from moving in a direction away from the bearing puck(s) 116.

It should also be appreciated that, although the embodiments shown in FIGS. 2-12 have a radial symmetry of three with regard to the positioning of bearing pucks 116, any other suitable radial symmetries may also be used. For instance, in one embodiment, radial symmetries of greater than three, such as a radial symmetry of four or more, may be used with regard to the positioning of bearing pucks 116.

Figure 13:
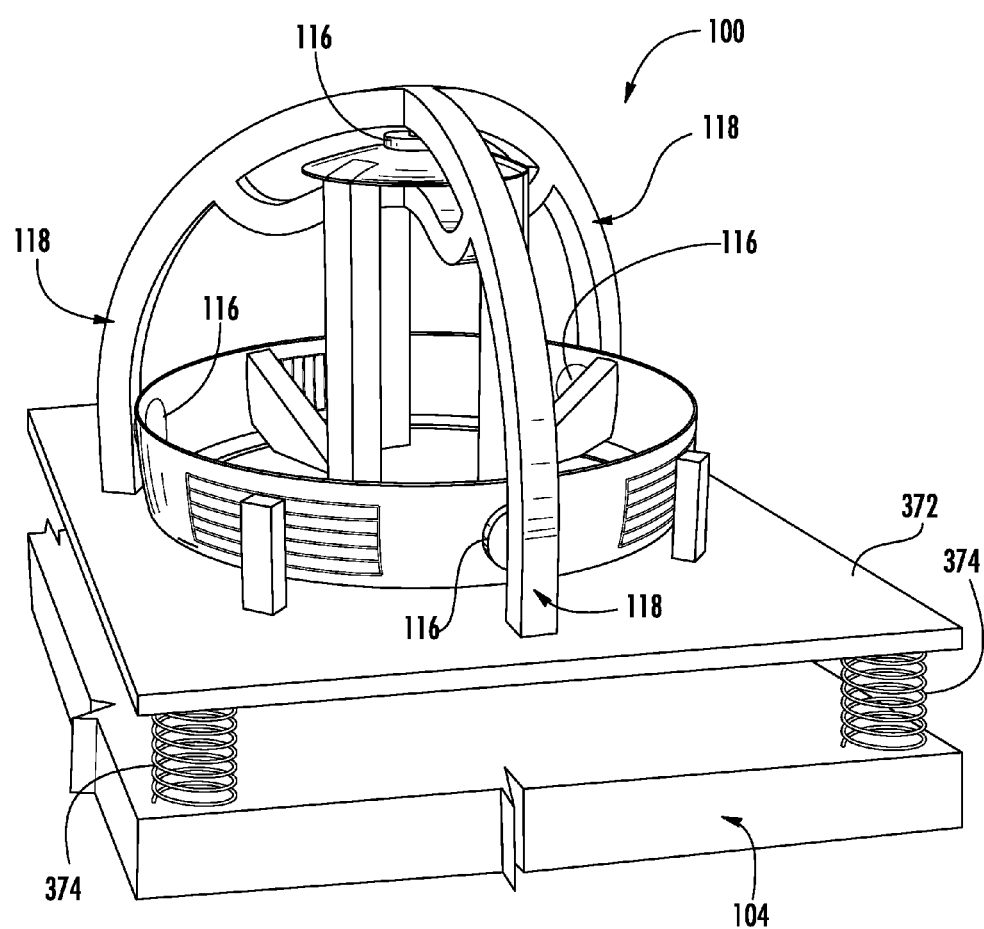
FIG. 13 illustrates a perspective view of the system shown in FIG. 2 having a damped connection to the base structure.

Referring now to FIG. 13, in a particular embodiment of the present subject matter, the disclosed system 100 may be configured to include a damped coupling between the bearing pucks 116 and the base structure 104. Specifically, as shown, the support structure 118 supporting the bearing pucks 116 may be mounted to or otherwise secured to a base member 372, such as a flat plate or any other suitable object. The base member 372 may, in turn, be coupled to the base structure 104 using one or more damping members 374, such as one or more springs and/or any other suitable damping device. As a result, the amount of vibrational and/or rotational motion transferred between the base structure 104 and the base member 372 may be minimized, thereby improving the overall operation of the disclosed system 100.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A system for isolating the motion of a camera relative to a base structure, the system comprising:

a plurality of bearing pucks coupled to the base structure, each of said plurality of bearing pucks being configured to receive and expel a pressurized fluid; and a camera support coupled to the camera, said camera support including at least one bearing member defining a spherical surface, said at least one bearing member being positioned adjacent to said plurality of bearing pucks such that the pressurized fluid forms a fluid layer between said spherical surface and said plurality of bearing pucks, wherein the fluid layer suspends said at least one bearing member relative to said plurality of bearing pucks such that the camera is rotationally isolated from the base structure.

2. The system of claim 1, wherein said spherical surface comprises a first spherical surface and a second spherical surface, a first bearing puck of said plurality of bearing pucks being positioned adjacent to said first spherical surface and a second bearing puck of said plurality of bearing pucks being positioned adjacent to said second spherical surface.

3. The system of claim 2, wherein said first and second bearing pucks are radially aligned on said at least one bearing member.

4. The system of claim 2, wherein said at least one bearing member is configured as a spherical cap.

5. The system of claim 1, wherein said spherical surface comprises an outer spherical surface, at least three bearing pucks of said plurality of bearing pucks being spaced apart around said outer spherical surface.

6. The system of claim 5 wherein said at least three bearing pucks are spaced apart equally around said outer spherical surface.

7. The system of claim 5, wherein said at least one bearing member is configured as a spherical segment.

8. The system of claim 1, wherein said at least one bearing member comprises a first bearing member and a second bearing member.

9. The system of claim 8, wherein said first and second bearing members have a common center of rotation.

10. The system of claim 8, wherein said first bearing member is configured as a top portion of a sphere and said second bearing member is configured as a middle portion of a sphere.

11. The system of claim 1, wherein said spherical surface comprises a first spherical surface and a second spherical surface.

12. The system of claim 11, wherein at least three bearing pucks of said plurality of bearing pucks are positioned adjacent to said first spherical surface and at least one bearing puck of said plurality of bearing pucks is positioned adjacent to said second spherical surface.

13. The system of claim 11, wherein said plurality of bearing pucks comprises at least three pairs of bearing pucks, each of the at least three pairs of bearing pucks including a first bearing puck positioned adjacent to said first spherical surface and a second bearing puck positioned adjacent to said second spherical surface, said first and second bearing pucks being radially aligned on said at least one bearing member.

14. The system of claim 1, wherein each of said plurality of bearing pucks defines a bearing surface having a radius of curvature corresponding to a radius of curvature of said spherical surface.

15. The system of claim 1, further comprising an actuation device configured to control the movement of said camera support relative to said plurality of bearing pucks.

16. The system of claim 15, wherein said actuation device comprises an electromagnetic actuation device.

17. The system of claim 16, wherein said electromagnetic actuation device includes a magnetic field generator coupled to the base structure and a magnet associated with said spherical surface.

18. The system of claim 15, further comprising a controller communicatively coupled to said actuation device, said controller being configured to control the operation of said actuation device.

19. The system of claim 18, further comprising a sensor communicatively coupled to said controller, said sensor being configured to monitor an orientation of said camera support.

20. The system of claim 1, wherein the fluid layer suspends said at least one bearing member relative to said plurality of bearing pucks such that said camera support is rotatable relative the base structure in three dimensions.

21. The system of claim 1, wherein a damped coupling is formed between said plurality of bearing pucks and the base structure.

22. A method for isolating the motion of a camera relative to a base structure, the camera being coupled to a camera support having at least one bearing member, the method comprising:
   supplying pressurized fluid to a plurality of bearing pucks coupled to the base structure, said plurality of bearing pucks being positioned adjacent to a spherical surface of the at least one bearing member; and
   suspending the camera support relative to said plurality of bearing pucks on a fluid layer formed between said spherical surface and said plurality of bearing pucks in order to rotationally isolate the camera from the base structure.

23. The method of claim 22, further comprising controlling the movement of the camera support relative to the at least one bearing member.

24. The method of claim 23, wherein comprising controlling the movement of the camera support relative to the at least one bearing member comprises controlling the operation of an actuation device associated with the at least one bearing member.

25. The method of claim 23, further comprising monitoring an orientation of the camera support relative to the base structure.

26. The method of claim 25, wherein controlling the movement of the camera support relative to the at least one bearing member comprises controlling the movement of the camera support based on the orientation of the camera support relative to the base structure.

27. A system for capturing aerial photography from an airplane, the system comprising:
   a camera configured to capture images from a fuselage of the airplane;
   a plurality of bearing pucks coupled to a portion of the fuselage, each of said plurality of bearing pucks being configured to receive and expel a pressurized fluid;
   a camera support coupled to said camera, said camera support including at least one bearing member defining a spherical surface, said at least one bearing member being positioned adjacent to said plurality of bearing pucks such that the pressurized fluid forms a fluid layer between said spherical surface and said plurality of bearing pucks,
   wherein the fluid layer suspends said at least one bearing member relative to said plurality of bearing pucks such that said camera is rotationally isolated from the fuselage.

* * * * *